United States Patent Office 3,529,969
Patented Sept. 22, 1970

3,529,969
PROTEIN BASE FOR BAKERY GOODS
Eugene J. Turro, Addison, Ill., assignor to Central Soya Company, Inc., Fort Wayne, Ind., a corporation of Indiana
No Drawing. Filed Sept. 1, 1966, Ser. No. 576,543
Int. Cl. A21d 13/00
U.S. Cl. 99—86        3 Claims

ABSTRACT OF THE DISCLOSURE

The protein base contains from about 30 to 50 percent ground oats, from about 20% to about 45% soy protein concentrate, from about 5% to about 10% isolated soy protein, and from about 5% to about 10% of egg white solids.

---

A general object of the invention is to provide a novel protein base for bakery goods which is advantageously versatile in its ability to be incorporated into a wide variety of bakery goods such as tarts, cookies, cakes, and breads. A more specific objective is to provide a dry protein base for a high-protein breakfast cookies which has the essential amino acids equivalent to that of a whole egg.

Other objects and advantages of the invention may be seen in the details set forth in this specification.

In one embodiment of the invention, I utilize—to provide a blended base—from about 30% to about 50% of a ground cereal such as rolled, fine-milled oats. Other cereal flours such as high gluten wheat flour can be used in certain instances, but for the most part the oat product is superior in providing a dough which results in cookie-like textural properties. Optimum results are obtained by using about 40% of the rolled, fine-milled oats.

In the above embodiment which is based on the dry blended base, I incorporate from about 20% to about 45% of a soy protein concentrate containing not less than 70% protein ($N \times 6.25$) on a moisture-free basis. The soy protein concentrate is "the product prepared from high-quality, sound, clean, dehulled soybeans by removing most of the oil and water-soluble, non-protein constituents therefrom." (As defined by National Soybean Processors Association; also found in the Soybean Digest Bluebook of March 1966, line 26, No. 6, page 20, as edited by American Soybean Association; and accepted by Meat Inspection Division of USDA). Optimum results are obtained using about 30% of the soy protein concentrate (Promosoy) such as is commercially available as manufactured by Central Soya Company, Inc., Chicago, Ill.

I further include about 1½% of the weight of the soy protein concentrate of methionine which is not present in substantial quantities in the soy protein concentrate.

In the above-mentioned embodiment of the invention, I also provide from about 10% to about 15% of non-fat dry milk, 5% to 10% of a high concentration isolated soy protein (upwards of 97% pure protein i.e., containing not less than 90% protein on a moisture free basis—also as defined in the Soybean Digest Bluebook, supra) which may take the form of Promine-D also available from Central Soya Company, Inc., Chicago, Ill., from about 5% to about 10% of egg while solids, and optionally from about 5% to about 10% egg yolk solids.

Specific examples of the invention are set forth below to illustrate the best mode currently known of practicing the invention.

EXAMPLE I

In the preparation of high-protein cookies, the following protein base formulation was employed.

FORMULATION

| Dry blend | Percent | Weight, g. |
|---|---|---|
| Rolled, fine-milled oats | 39.5 | 900 |
| Promosoy | 28.9 | 660 |
| Non-fat dry milk | 13.2 | 300 |
| Promine-D | 7.9 | 180 |
| Egg yolk solids | 5.25 | 120 |
| Egg white solids | 5.25 | 120 |
| Methionine (based on 1½% Promosoy wgt.) | | 9.9 |

The dry blend is mixed for 15 minutes in a Hobart A 200 (20 qt.) mixing bowl, first speed, after which the following ingredients were added to the 160 grams of the dry blend, the ingredients being mixed at 1 minute at the first speed of the blender; 4 grams baking soda, 120 grams sucrose, 4 grams salt, 2 grams protease (Red Star Yeast) and cinnamon. Thereafter, vegetable shortening in the amount of 28 grams was added and mixed at 30 seconds at the first speed and finally 71 ml. of water at 75° F. were added and mixed two minutes at the first speed.

The final dough temperature was 78° F. and two hours' enzyme lay time was used. The dough was made up into cookies 3" x 3" x ¼" using as little dusting flour as possible. The scaling weight was 58 grams and the bake-out weight 45½ grams (approx. 1.6 oz.) resulting in a bakeout loss of 8.5 grams or 15.75%.

Cookies made according to the foregoing formulation were found to be of equal or superior quality to those using milk protein in place of the soy protein concentrate. The same was true when a comparison was made with cookies utilizing whole egg solids in place of the soy protein concentrate.

The amino acid content of the cookies made according to the foregoing example are compared with those made with whole egg solids as can be seen in the table below.

TABLE

Essential amino acid content (g./100 g.) [1]

| | Whole eggs | Example cookie |
|---|---|---|
| Cystine [2] | 0.30 | 0.36 |
| Histidine | 0.31 | 0.56 |
| Isoleucine | 0.85 | 1.04 |
| Leucine | 1.13 | 1.78 |
| Lysine | 0.82 | 1.02 |
| Methionine | 0.40 | 0.43 |
| Phenylalanine | 0.74 | 1.10 |
| Threonine | 0.64 | 0.91 |
| Tryptophan | 0.21 | 0.21 |
| Valine | 0.95 | 1.14 |

Other analyses,[3] percentages

| | | |
|---|---|---|
| Protein (Kjeldahl) 6.25 | 12.9 | 21.6 |
| Moisture | 73.7 | 8.5 |
| Fat | 11.5 | 9.0 |
| Protein dry basis | 49.2 | 23.6 |

[1] Amino Acid Content of Foods, Home Economics Research Report No. 4, USDA, 1957.
[2] Non-essential but has methionine sparing action.
[3] Composition of Foods, Agricultural Handbook No. 8, Agricultural Research Service, USDA, 1963, U.S. Government Printing Office.

EXAMPLE II

A high-protein cookie similar to that described in Example I was prepared except the amount of egg yolk solids has been decreased in favor of egg white solids with the result of a somewhat lighter and firmer cookie.

The composition of the dry blend, including amino acid analyses was as follows:

FORMULATION

| Dry blend | Percent | Weight, g. |
| --- | --- | --- |
| Rolled Oats | 39.5 | 900 |
| Promosoy | 28.9 | 660 |
| Non-fat dry milk | 13.4 | 300 |
| Promine-D | 7.9 | 120 |
| Egg yolk solids | 2.25 | 51.5 |
| Egg white solids | 8.25 | 189.5 |
| Methionine | | 9.9 |

Essential amino acid content (g./100 g.) [1]

| | Whole eggs | Example cookie |
| --- | --- | --- |
| Cystine [2] | 0.30 | 0.38 |
| Histidine | 0.31 | 0.64 |
| Isoleucine | 0.85 | 1.08 |
| Leucine | 1.13 | 1.82 |
| Lysine | 0.82 | 1.03 |
| Methionine | 0.40 | 0.51 |
| Phenylalanine | 0.74 | 1.27 |
| Threonine | 0.64 | 0.92 |
| Tryptophan | 0.21 | 0.21 |
| Valine | 0.95 | 1.20 |

Other analyses,[3] percentages

| | | |
| --- | --- | --- |
| Protein (Kjeldahl) 6.25 | 12.9 | 20.3 |
| Moisture | 73.7 | 7.3 |
| Fat | 11.5 | 9.0 |
| Protein dry basis | 49.2 | 22.0 |

[1] Amino Acid Content of Foods, Home Economics Research Report No. 4, USDA, 1957.
[2] Non-essential but has methionine sparing action.
[3] Composition of Foods, Agricultural Handbook No. 8, Agricultural Research Service, USDA, 1963, U.S. Government Printing Office.

EXAMPLE III

In the preparation of a high-protein bread a base protein mix, similar to that of Example I, was developed. To simplify the manufacture of a protein bread, the regular sponge can be utilized. This can be prepared either from clear flour or patent flour. An example of the sponge used is as follows:

Flour—clear or patent—560 lbs.
Yeast—24 lbs.
Yeast food—4 lbs.
Water—345 lbs.
Enrichment tablets—(9)

The sponge is allowed to ferment in a fermentation room for 3 hours before it is made up into a dough. The protein mix is added at this stage. An example of the dough make up is as follows:

|  | Lbs. |
| --- | --- |
| Flour—patent | 240 |
| Sugar (sucrose) | 40 |
| Yeast | 8 |
| Mono-diglyceride | 1.8 |
| Protein mix | 160 |
| Water | 390 |

The dry protein mix is basically the same as that used in the high-protein cookie mix of Example I. Non-fat dry milk and methionine have been eliminated, and egg protein has been reduced since its functional value in bread is not as critical as it is in a cookie; the protein level was then adjusted with soy protein.

The composition of the dry protein mix employed in this formulation is as follows:

FORMULATION

| Dry blend | Percent | Weight, lbs. |
| --- | --- | --- |
| Rolled oats | 37.6 | 60 |
| Promosoy | 39.4 | 63 |
| Promine-D | 7.5 | 12 |
| Egg white solids | 2.5 | 4 |
| Egg yolk solids | 2.5 | 4 |
| Salt | 10.5 | 17 |

The normal procedure is used in the make up of the dough. The fermented sponge is added to the mixer accompanied by the ingredients used in the dough-development. The dough is mixed for the prescribed amount of time to develop the gluten. The resultant dough is then rested, divided, moulded, panned, proofed and baked.

The above bread was air-dried and analyzed as follows:

|  | Percent |
| --- | --- |
| Moisture | 9.70 |
| Fat | .10 |
| Protein | 19.93 |
| Fibre | .77 |

A typical analysis of commercial white bread containing 3% non-fat dry milk using the same air dry technique is as follows:

|  | Percent |
| --- | --- |
| Moisture | 8.15 |
| Fat | 1.24 |
| Protein | 12.25 |
| Fibre | 1.00 |

The bread produced using the protein mix has over 50% more protein content than the standard commercial white bread currently sold using 3% non-fat dry milk, and substantially higher protein when compared to the commercial white bread produced with less than 3% non-fat dry milk.

The amino acid content of the bread crumbs was evaluated against a typical commercial white bread. The analysis shows that the bread produced with the protein mix has a much more favorable amino acid profile than the commercially produced white bread, especially for the essential amino acids necessary for growth. Lysine, which is normally deficient in wheat flour that constitutes approximately 70% of the weight of a loaf of bread, was found to be considerably lower in commercial white bread crumbs than in the bread crumbs containing the dry protein mix.

The amino acid comparisons are given in the following table:

| | Essential Amino Acid Content (g./100 g.) | |
| --- | --- | --- |
| | White bread crumbs | Protein bread crumbs |
| Lysine | 0.27 | 0.62 |
| Histidine | 0.26 | 0.45 |
| Threonine | 0.35 | 0.63 |
| Cystine | 0.30 | 0.40 |
| Valine | 0.48 | 0.84 |
| Methionine | 0.21 | 0.28 |
| Isoleucine | 0.43 | 0.75 |
| Leucine | 0.80 | 1.34 |
| Phenylalanine | 0.56 | 0.96 |
| Tryptophane | 0.10 | 0.19 |

While in the foregoing specification a detailed description of an embodiment of the invention has been drawn for the purpose of explanation, many variations in the foregoing may be made by those skilled in the art without departing from the spirit and scope of the invention.

I claim:
1. A protein base for bakery goods comprising from about 30% to about 50% ground oats, from about 20% to about 45% soy protein concentrate containing not less than 70 protein on a moisture-free basis, from about

5% to about 10% isolated soy protein containing not less than 90% protein on a moisture-free basis, and from about 5% to about 10% of egg white solids.

2. The composition of claim 1 in which from about 10% to about 15% non-fat dry milk is also included.

3. The composition of claim 2 in which said oats are rolled, fine-milled oats and the percentage thereof is about 40%, the said soy protein concentrate being present in an amount of about 30%.

References Cited

UNITED STATES PATENTS

| 3,185,574 | 5/1965 | Gabby et al. | 99—86 |
| 3,252,807 | 5/1966 | Kuramoto | 99—90 |

RAYMOND N. JONES, Primary Examiner

U.S. Cl. X.R.

99—90, 92